Jan. 7, 1930. C. H. WARDELL, JR 1,742,430
MAKING DENTURES
Filed May 7, 1927

Inventor
Charles H. Wardell Jr.
By his Attorneys
Cooper, Kerr & Dunham

Patented Jan. 7, 1930

1,742,430

UNITED STATES PATENT OFFICE

CHARLES H. WARDELL, JR., OF CLEVELAND, OHIO, ASSIGNOR TO OHIO CHEMICAL & MANUFACTURING COMPANY, OF CLEVELAND, OHIO, A CORPORATION OF OHIO

MAKING DENTURES

Application filed May 7, 1927. Serial No. 189,465.

In making dentures in which the tooth-supporting body or base is composed essentially of a phenolic condensate or analogous material, there is more or less danger of breaking teeth if care is not used in applying the necessary pressure on the mold before or during the application of the heat needed to "cure" the material. This danger is greater with a high curing temperature, which latter is sometimes desirable in order to shorten the time required for curing.

It is my belief that a fruitful cause of breakage is the peculiar behavior of the phenolic condensate composition in the mold or investment. The latter expands as long as the curing temperature is rising, whereas the condensate appears to expand at first and then, while the temperature is still increasing, begins to contract; with the result that unbalanced stresses are exerted on the teeth, which stresses may be powerful enough to cause breakage. In my copending application Serial No. 126,989, filed August 4, 1926, I have described in detail a way of overcoming the trouble by investing the teeth in a mold composed at least in part of material which is capable of yielding more or less under the conditions prevailing during the cure. Then if unequal expansion or contraction occurs the stress on the teeth is taken up or relieved, by the yield of the investment, sufficiently to prevent breakage.

My present invention is directed to the same end, that is, lessening the danger or possibility of breaking teeth in the curing operation, and in one way of practicing the invention the teeth may be invested in the ordinary manner, that is, set in a mold or investment composed essentially of Keene's cement or ordinary plaster of Paris, after which the tooth-portions which are to be embedded in the condensate or condensate composition are given a coat, preferably a thin coat, of a composition which will yield in the course of the cure if excessive stresses tending to bend or twist the teeth are encountered. Or, alternatively, after the teeth have been "waxed up" and before they are invested the exposed portions—in this case the portions which are to be exposed in the finished denture—are coated with the yielding composition, after which the coated portions are invested and the wax boiled out. The portions embedded in the plaster are thus surrounded by a film which acts in the manner described in my copending application mentioned, that is, it yields when the teeth are subjected to unbalanced stresses such as might result from unequal contraction or expansion.

Referring now to the accompanying drawings, which are somewhat diagrammatic in character.

Figure 1:
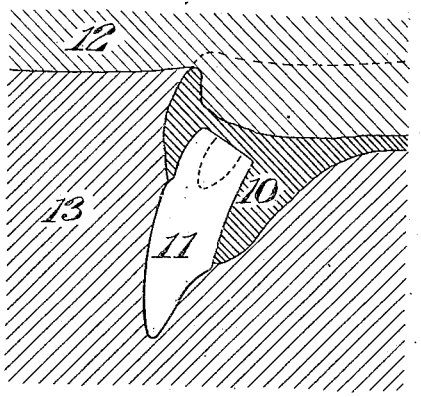
Fig. 1 is a longitudinal section illustrating a portion of a denture for the upper jaw, showing a tooth invested in the plaster mold before the wax model is melted out.
Figure 2:
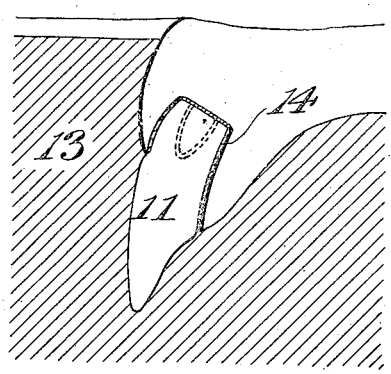
Fig. 2 is a similar section after the wax model has been melted out. The upper half of the investment or mold is not shown in this figure.
Figure 3:
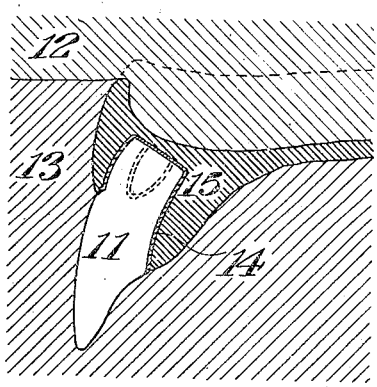
Fig. 3 is a similar section showing the root-portion of the tooth coated with the yielding film or veneer, the investment reassembled, and the mold cavity packed with the condensate composition.

In carrying out in the preferred manner the process illustrated in Figs. 1, 2 and 3 I first take a plaster impression of the jaw and from that I make the usual wax model with the teeth mounted therein. A portion of such a model is shown at 10, Fig. 1, which also shows a tooth 11 set in the wax. The model is now invested in appropriate material (as for example plaster of Paris or Keene's cement containing finely divided aluminum or other metal to give higher heat conductivity), forming a mold or investment in two parts, as 12 and 13, Fig. 1, after which the parts are separated and the wax boiled out, leaving the teeth fixed in the lower section of the mold as in Fig. 2. The entire mold is then thoroughly dried, preferably made "bone dry", I next coat the exposed or root-portions of the teeth with a thin film of a suitable yielding material, as indicated in section at 14, Fig. 2, and the coating is allowed to dry, after which the mold cavity is packed with the plastic denture composition. The mold is then closed and subjected to the requisite heat and pressure to cure the condensate or vulcanize the rubber as the case may be. This stage is illustrated in Fig. 3, in which the denture composition, in the present instance a composition containing a phenolic condensation product as the principal ingredient, is indicated at 15. As the condensate hardens in the cure, stresses caused by difference in the expansion and contraction of the investment 12—13 and the condensate 15 are exerted on the film or veneer 14, which yields sufficiently to prevent breaking the tooth. As contraction occurs around the tooth the softened veneer is squeezed out, and the tooth is left in contact with the condensate composition itself; unless the veneer coating were too thick, in which case it may not be all squeezed out. The latter condition is not in general desirable, as it may result in loosening of the teeth after the denture has been in use for some time.

For the yielding film or coating 14 I have used various compositions with satisfactory results. I prefer a material which is hard when cold and softens at temperature well up toward or above the temperature at which the condensate is packed in the mold. For such compositions shellac, uncured gum rubber, uncured vulcanite stock, and the synthetic resin known as coumar, are suitable, mixed with benzol, acetone, ether, alcohol, or other suitable vehicle or solvent, preferably volatile. The preferred compositions are the following, which may, however, be varied widely:

(A) Coumar (varnish grade), 50 grams; uncured vulcanite stock, 60 grams; acetone 100 cc., ether 100 cc. The uncured vulcanite stock may consist of caoutchouc 48 parts, sulfur 24 parts, zinc oxid 96 parts, by weight.

(B) Uncured gum rubber 50 grams, coumar (varnish grade) 50 grams, benzol, and acetone in any suitable proportions, to make a saturated solution.

(C) Shellac 450 grams, alcohol 1000 cc.

Where the yielding composition is to be used with a denture composition containing a phenolic condensate, water should be rigidly excluded, as the presence of moisture during curing may and usually does affect the condensate injuriously. Similarly, nothing should be used which will harmfully react with any ingredient of the denture composition. The coating or veneer compositions given above dry hard when cold. If a composition is desired which will dry slightly soft when cold, a solution of gum rubber in benzol, acetone, or other suitable solvent, may be used. Preferably the composition is thin enough to be painted on, but if too stiff for that method it may be applied with a small knife or other instrument.

Figure 4:
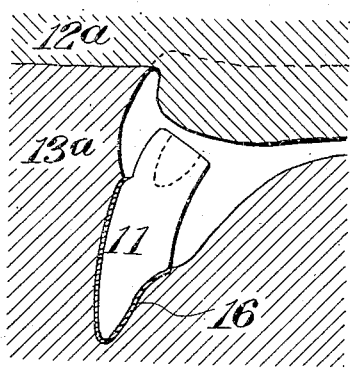
Fig. 4 is a similar section showing the yielding veneer or coating applied to the tooth portion which is embedded in the plaster.
Figure 5:
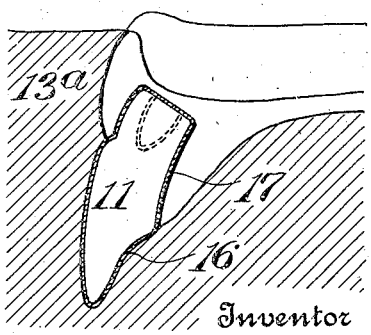
Fig. 5 is a similar section showing the entire tooth coated with the yielding material.

Fig. 4 illustrates a modification of the process. In this case the teeth are set in a wax model as in the first case, but before investing the model the exposed portions of the teeth are coated with the veneer composition, as indicated at 16, after which the model is invested and the mold completed in two separable parts 12ª, 13ª, providing a cavity between them for the denture composition. Now when the curing pressure and temperature are applied the coating or veneer 16 yields to unbalanced stresses produced as above described and the teeth are thereby prevented from breaking. As a further precaution the tooth-portions exposed after investing may also be coated with the yielding veneer composition, as indicated at 17 in Fig. 5. After cure is completed and the investment is broken away the veneer 16 can be scraped off or washed off with a suitable solvent.

It is to be understood that the invention is not limited to the details herein specifically described but can be carried out in other ways without departure from its spirit.

I claim—

1. In a process of making dentures in which a plastic denture composition is hardened in a mold, the improvement comprising coating the teeth with a veneer of yielding material over a sufficient area thereof to prevent breakage by stresses exerted thereon in the course of the hardening, packing the mold with plastic denture composition, and hardening the composition under pressure.

2. In a process of making dentures in which a plastic denture composition is hardened in a mold, the improvement comprising painting the teeth over a sufficient area thereof to prevent breakage by stresses exerted thereon in the course of the hardening, with a composition containing a yielding material and a liquid vehicle therefor, packing the mold with plastic denture composition, and hardening the composition under pressure.

3. In a process of making dentures in which a plastic denture composition is hardened in a mold by the application of heat and pressure, the improvement comprising coating the teeth over a sufficient area thereof to prevent breakage, with a veneer of material which is yielding at a temperature to which the denture composition is subjected in hardening, packing the mold with plastic denture composition, and subjecting the whole to heat and pressure to harden the plastic composition.

4. In a process of making dentures in which a plastic denture composition is hardened in a mold, the improvement comprising coating the root portions of the teeth with a veneer of material capable of yielding under stresses arising in the course of the hardening to prevent breakage of the teeth, packing plastic denture composition in the mold and embedding the coated root-portions of the teeth therein, and hardening the plastic composition under pressure.

5. In a process of making dentures in which a plastic denture composition is hardened in a mold, the improvement comprising coating the teeth all over with a veneer of material capable of yielding under stresses arising in the course of hardening, to prevent breakage of the teeth, packing plastic denture composition in the mold and embedding the coated root-portions of the teeth therein, and hardening the plastic composition under pressure.

6. In a process of making dentures, waxing the teeth and investing the same, removing the wax, coating the exposed root-portions with a veneer of yielding material, to prevent breakage thereof during the subsequent hardening of the denture composition, packing the investment with plastic denture composition, and subjecting the whole to heat and pressure to harden the denture composition.

7. In a process of making dentures, waxing the teeth, coating the exposed portions of the teeth with a veneer of yielding material, investing the teeth and removing the wax, applying to the then exposed portions of the teeth a yielding veneer, to prevent breakage thereof during the subsequent hardening of the denture composition, packing the investment with plastic denture composition, and hardening the latter with heat and pressure.

8. In a process of making dentures in which a plastic denture composition is hardened in a mold, the improvement comprising coating the teeth over a sufficient area to prevent breakage, with a veneer containing a liquid vehicle and solid material which is soft when warm, packing plastic denture composition in the mold and embedding the coated root-portions of the teeth therein, and hardening the plastic composition under pressure.

9. In a process of making dentures in which a plastic denture composition is hardened in a mold, the improvement comprising coating the teeth over a sufficient area to prevent breakage, with a veneer containing a volatile liquid vehicle and coumar, packing plastic denture composition in the mold and embedding the coated root-portions of the teeth therein, and hardening the plastic composition under pressure.

10. In a process of making dentures in which a plastic denture composition is hardened in a mold, the improvement comprising coating the teeth over a sufficient area to prevent breakage, with a veneer containing a volatile liquid vehicle, coumar, and uncured vulcanite stock, packing plastic denture composition in the mold and embedding the coated root-portions of the teeth therein, and hardening the plastic composition under pressure.

11. In a process of making dentures in which a plastic denture composition is hardened in a mold, the improvement comprising coating the teeth over a sufficient area to prevent breakage, with a veneer containing coumar and acetone, packing plastic denture composition in the mold and embedding the coated root-portions of the teeth therein, and hardening the plastic composition under pressure.

12. In a process of making dentures in which a plastic denture composition is hardened in a mold, the improvement comprising coating the teeth over a sufficient area to prevent breakage, with a veneer containing coumar, uncured vulcanite, acetone and ether, packing plastic denture composition in the mold and embedding the coated root-portions of the teeth therein, and hardening the plastic composition under pressure.

13. In a process of making dentures in which a plastic denture composition is hardened in a mold, the improvement comprising coating the teeth over a sufficient area to prevent breakage, with a veneer containing the following ingredients in approximately the proportions named: coumar 50 grams, uncured vulcanite 60 grams, acetone 100 cc., ether 100 cc., the vulcanite containing caoutchouc, sulfur, and zinc oxid; packing the plastic denture composition in the mold and embedding the coated root-portions of the teeth, and hardening the composition under pressure.

14. Process of making dentures described in claim 6, in which the veneer material is a composition containing coumar and a volatile liquid vehicle.

15. Process of making dentures described in claim 6, in which the veneer material is a composition containing the following ingredients in approximately the proportions named: coumar 50 grams, uncured vulcanite 60 grams, acetone 100 cc., ether 100 cc., the vulcanite containing caoutchouc, sulfur, and zinc oxid.

In testimony whereof I hereto affix my signature.

CHARLES H. WARDELL, Jr.